(12) United States Patent
Bettinzoli (10) Patent No.: US 9,222,667 B2
(45) Date of Patent: Dec. 29, 2015

(54) GAS BURNER FOR OVENS

(75) Inventor: Angelo Bettinzoli, Concesio (IT)

(73) Assignee: SABAF S.P.A., Ospitaletto (BS) (IT)

( * ) Notice: Subject to any disclaimer, the term of this patent is extended or adjusted under 35 U.S.C. 154(b) by 1156 days.

(21) Appl. No.: 12/996,059

(22) PCT Filed: Jun. 23, 2008

(86) PCT No.: PCT/IT2008/000423
§ 371 (c)(1),
(2), (4) Date: Dec. 3, 2010

(87) PCT Pub. No.: WO2009/157022
PCT Pub. Date: Dec. 30, 2009

(65) Prior Publication Data
US 2011/0079212 A1 Apr. 7, 2011

(51) Int. Cl.
*F23D 14/10* (2006.01)
*F23D 14/70* (2006.01)
*A47J 37/07* (2006.01)

(52) U.S. Cl.
CPC .............. *F23D 14/105* (2013.01); *F23D 14/70* (2013.01); *A47J 37/0713* (2013.01); *F23D 2900/00003* (2013.01)

(58) Field of Classification Search
CPC .......... F24C 3/085; F24C 3/087; F23D 14/06; F23D 14/08; F23D 14/10; F23D 14/105; F23D 14/70; F23D 2900/00003; A47J 37/0713
USPC ................................ 126/39 E, 25 R, 29, 41 R
See application file for complete search history.

(56) References Cited

U.S. PATENT DOCUMENTS

| 2,193,176 | A | * | 3/1940 | Krugler | F23D 14/10 126/271.2 B |
| 2,255,636 | A | * | 9/1941 | Wittmann | F23D 14/10 239/566 |
| 2,755,851 | A | | 7/1956 | Dow et al. | |
| 3,028,909 | A | | 4/1962 | Faure | |
| 3,233,654 | A | * | 2/1966 | Anderson | F23D 14/10 159/43.1 |

(Continued)

FOREIGN PATENT DOCUMENTS

| GB | 335256 | A | * | 9/1930 | ............. F23D 14/10 |
| GB | 1282863 | A | * | 7/1972 | ............ F23D 14/105 |

(Continued)

*Primary Examiner* — Gregory Huson
*Assistant Examiner* — Daniel E Namay
(74) *Attorney, Agent, or Firm* — Lucas & Mercanti LLP (57) ABSTRACT

Gas burner (1) for oven, or grill, of the type comprising a Venturi tube (2) for mixing fuel gas and primary air, a main distribution chamber (3), longitudinally extended in the flow forwarding direction of the mixture, and located downstream to such a Venturi tube (2), as well as at least one delivery chamber (22*a*, 22*b*) placed outside the afore said main chamber (3), and provided with flame holes (4; 4*a*, 4*b*, 4*c*, 4*d*) for the gas-primary air mixture outflow, such a main chamber (3) and such an outer chamber (22*a*, 22*b*) being reciprocally fluidically connected, for at least one longitudinal length of the same main chamber (3), by at least one through opening (16*a*, 16*b*, 17*a*, 17*b*). Advantageously, the afore said through opening (16*a*, 16*b*, 17*a*, 17*b*) has, relative to the forwarding longitudinal direction of the mixture flow, a greater cross section in the upstream portion and smaller cross section in the downstream portion of the afore said longitudinal length of the main chamber (3).

11 Claims, 5 Drawing Sheets

(56) References Cited

U.S. PATENT DOCUMENTS

| | | | | |
|---|---|---|---|---|
| 4,305,372 A * | 12/1981 | Hahn | ...................... | F23D 14/58 |
| | | | | 126/39 E |
| 5,391,076 A * | 2/1995 | Home | ..................... | F23D 14/06 |
| | | | | 126/39 E |
| 6,364,657 B1 * | 4/2002 | O'Donnell | .............. | F23D 14/06 |
| | | | | 431/286 |
| 6,428,313 B1 * | 8/2002 | Rodgers | ................. | F23D 14/10 |
| | | | | 126/39 R |
| 6,659,765 B1 | 12/2003 | Sen-Yu | | |
| 7,267,544 B2 * | 9/2007 | Spangrud | ...................... | 431/354 |
| 7,506,645 B2 * | 3/2009 | Offredi | ....................... | 126/91 A |
| 2005/0133018 A1 * | 6/2005 | Spangrud | ..................... | 126/41 R |
| 2007/0009847 A1 * | 1/2007 | Wu | ....................... | F23D 14/105 |
| | | | | 431/354 |
| 2007/0026355 A1 * | 2/2007 | Cummings | ........... | F23D 14/105 |
| | | | | 431/354 |
| 2007/0221192 A1 * | 9/2007 | Chung | ........................ | 126/39 E |
| 2008/0053429 A1 * | 3/2008 | Pezzutti | ...................... | 126/39 E |
| 2008/0210217 A1 * | 9/2008 | Offredi | ....................... | 126/39 E |
| 2009/0205631 A1 * | 8/2009 | Tsung | ......................... | 126/39 E |
| 2011/0067686 A1 * | 3/2011 | Bettinzoli | .............. | F23Q 9/045 |
| | | | | 126/39 E |
| 2011/0079212 A1 * | 4/2011 | Bettinzoli | ............. | F23D 14/105 |
| | | | | 126/39 E |

FOREIGN PATENT DOCUMENTS

| | | | | |
|---|---|---|---|---|
| GB | 1386442 A | * | 3/1975 | ............ F23D 14/105 |
| IT | WO 2009157022 A1 | * | 12/2009 | ............ F23D 14/105 |
| JP | 02057809 A | * | 2/1990 | |
| JP | 11132418 A | * | 5/1999 | |
| WO | WO 2004005799 A1 | * | 1/2004 | ............... F23D 14/10 |

* cited by examiner

GAS BURNER FOR OVENS

CROSS-REFERENCE TO RELATED APPLICATION

This application is a 371 of PCT/IT2008/000423 filed Jun. 23, 2008, the contents of which are incorporated herein by reference.

FIELD OF THE INVENTION

The present invention refers to a gas burner for ovens, or grills, of the type comprising a Venturi tube for mixing fuel gas and primary air, a main chamber, longitudinally extending in the flow forward direction of the mixture, and located downstream from the Venturi tube, as well as comprising at least one chamber outside such a main chamber, fluidly connected to the latter, and provided with flame holes for the outflow of the gas-primary air mixture.

BACKGROUND OF THE INVENTION

It is known art that gas burners for domestic ovens, or grills can comprise a first extended chamber for distributing the gas-primary air fuel mixture, immediately placed downstream to the mixing tube having a Venturi effect, and a second delivery chamber, fluidly connected to the first one, provided with outflow holes outwardly for such a fuel mixture (flame holes). The shape and dimensions of the fuel mixture passageways from the distribution chamber to the delivery chamber, as well the shape of the delivery chamber and of the corresponding outflow holes, determines the local thermodynamic conditions of the mixture inside the burner, particularly its point by point pressure and concentration, and thereby determines the flame shape, profile, and distribution outside the outflow holes of the second chamber.

For example, the U.S. Pat. No. 3,156,292, in the name of ROSS, describes a similar gas burner for ovens, in which a tubular distribution chamber, longitudinally extending in the inflow direction of the fuel mixture, and situated downstream from the mixing tube, is fitted in an outer case provided with flame holes. The outer case defines, between its upper wall and the distribution tubular chamber itself, a delivery chamber, that is fluidly connected to the distribution chamber via some passageways, longitudinally extending, and obtained over the walls of the latter. Such longitudinally extended passageways have the object to guarantee the homogeneous gas inflow from the distribution chamber to the mixing chamber and thereby guarantee some homogeneity in the flame distribution and profile.

Such a solution, although aiding a fair burner operation, does not consider the pressure difference generating within the tubular distribution chamber because of the sudden stop of the mixture flow at the closed end, opposite to the mixing tube, of the distribution chamber itself, which is opposite to the mixing tube.

Particularly, the mixture flow within the tubular distribution chamber, given by the gas outflow from the corresponding injector, longitudinally proceeds from the Venturi tube towards the closed end of the distribution chamber itself, where it encounters the ending closed wall of the latter, that will obstruct, divert and render the flow itself incoherent. Because of this, within the distribution chamber a non-null pressure gradient is generated, whereby the pressure is locally greater at the closed end of the distribution chamber and is locally smaller at the outlet section of the mixing tube.

Such a pressure gradient, as it will be evident to a person skilled in the art, will cause a non-homogeneous distribution of the mixture in the burner and then, even if in the presence of an outer delivery chamber, separated from the tubular distribution chamber, will generate an heterogeneous distribution of the flames, and consequently a non-constant geometrical distribution of the temperature and heat from the burner.

One attempt to solve this problem in International Patent Application WO 2004/005799, in the name of CAST srl, describes an extended burner for ovens of the type comprising a tubular extended distribution chamber of the fuel mixture situated downstream the gas and primary air mixing tube with a Venturi effect (Venturi tube). The mixture distribution chamber, for some length starting from the Venturi tube, is situated in fluid communication, by some sort of a longitudinal coil, with an outer delivery chamber provided with flame holes.

The described structure of such a coil is provided by two longitudinal ribs inside the burner, reciprocally and transversally spaced, and of height lower than the burner chamber height, and provides some walls disposed to carry part of the mixture flow to the delivery chamber, which is situated sideways to the tubular distribution chamber, thereby forming some sort of a trap for the mixture, which would reach a higher pressure at the flame holes being present in the delivery chamber.

Such a higher pressure, that would occur only at those flame holes of the burner placed in the delivery chamber in a position near the Venturi tube, would be sufficient to compensate the greater pressure occurring at the burner end opposite from the Venturi tube, wherein the flame holes are directly obtained into the distribution chamber and there is not any outer delivery chamber, thereby concurring in regulating the distribution of the burner flames. This solution described in the CAST application tried to solve the problem of the existence of a pressure gradient in the mixture within the distribution chamber of the burner, but, apart from resulting practically difficult to put into action, it does not achieve, within the main distribution chamber or within the delivery chamber, a sufficient homogeneity in distributing the local pressure of the mixture thereby making the flames regular and homogeneous along the whole burner.

It is an object of the present invention to realize a burner for domestic ovens or grills that does not have the drawbacks of the oven burners known in the art exhibiting a regular flame distribution for the whole longitudinal extension of the burner itself.

It is therefore an object of the present invention to provide a burner for ovens of the type comprising a Venturi tube for mixing fuel gas and primary air and a longitudinally extended distribution chamber, located downstream the Venturi tube, exhibiting on its own inside a regular distribution of the mixture pressure for the whole burner extension, at least at the corresponding flame holes.

It is another object of the present invention to provide an oven or grill burner of the aforementioned type, that allows to have regularly and homogeneously distributed flames for the whole development of the burner itself.

SUMMARY OF THE INVENTION

These and other objects are obtained by the oven or grill burner according the first independent claim and the following dependent claims.

The gas burner for ovens, or grills, according to the present invention comprises a Venturi tube for mixing fuel gas and primary air, a main distribution chamber, longitudinally extended in the flow forward direction of the mixture, and located downstream to the Venturi tube, as well as at least one delivery chamber placed outside such a main chamber and provided with flame holes for the outflow of the gas-primary air mixture. The main distribution chamber and the outer delivery chamber are both fluidly connected, at least for a longitudinal length of the main chamber, by at least one through opening that, advantageously, has, relative to the longitudinal forward direction of the mixture flow, a greater cross section in the upstream portion and a smaller cross section in the downstream portion along the longitudinal length.

Preferably, although not necessarily in a continued way along the whole longitudinal extension of the aforesaid main chamber, the through opening between the main chamber and the outer chamber, develops for the whole extension of the main chamber, from the outlet section of the Venturi tube to substantially the ending wall, opposite to the Venturi tube, of such a main chamber.

Such a solution allows an effective regulation of the local pressure in the aforesaid outer delivery chamber, forcing the mixture to outflow through passageways having differently shaped sections, to produce dissimilar load losses on the mixture flow.

In practice, thanks to the solution claimed herein, the load losses will be greater at that through opening between the two chambers having a smaller section, placed in proximity of the closed burner end, and will be on the contrary smaller where the through opening will show a greater section, that is in proximity of the outlet section of the Venturi tube. In such a way, the fuel mixture pressure and distribution in the outer delivery chamber will be practically homogeneous for the whole burner, allowing a similar homogeneous and regular distribution of the burner flames.

In addition, according to a preferred aspect of the present invention, the burner comprises two outer delivery chambers having a longitudinal development along the axes parallel to the axis of the main distribution chamber, and disposed at the sides of the latter.

In a preferred embodiment of the present invention, the burner comprises an upper shell, an intermediate diaphragm and a lower shell, reciprocally coupled so as to define both the Venturi tube and the afore said main chamber and the outer chambers, and a further compensation chamber, placed at the bottom. In such an embodiment, the particular shape of the intermediate diaphragm, with a concave portion and at least one convex portion, allows to easily and precisely determine the cross section of the aforesaid through openings between the main chamber and the outer chamber, or the outer chambers, of the burner.

In such an embodiment of the burner according to the present invention, the Venturi tube is preferably a Venturi tube with an axial development.

BRIEF DESCRIPTION OF THE DRAWINGS

For purposes of illustrations only and not limitative a preferred embodiment of the burner for ovens or grills of the present invention will be described with reference to the accompanying figures, in which.

DETAILED DESCRIPTION OF A PREFERRED EMBODIMENT OF THE PRESENT INVENTION

Figure 1:
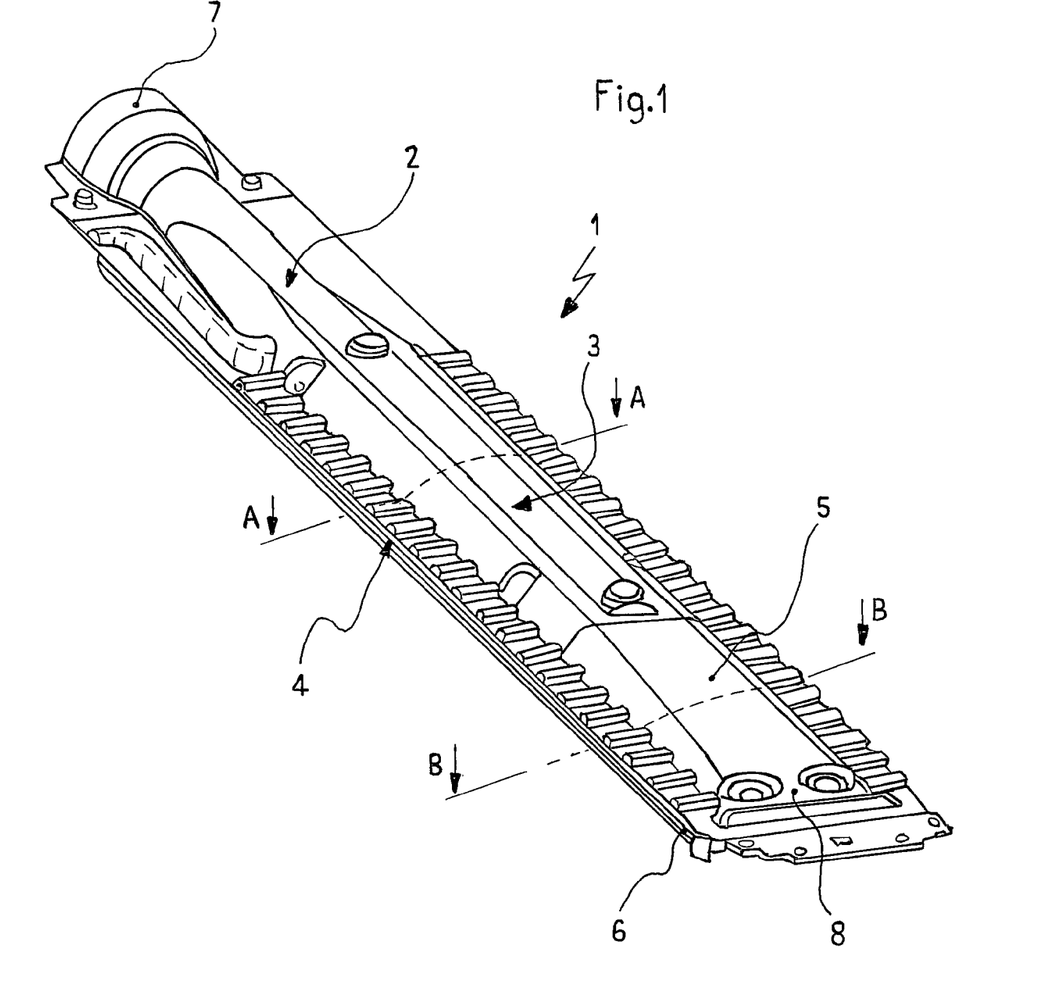
FIG. 1 is a top perspective view of a burner according to a particular aspect of the present invention.

Referring first to FIG. 1, the oven or grill burner 1, according to an aspect of the present invention, is constituted by an upper shell 5 and a lower shell 6, reciprocally coupled and attached in a known way, which defines the outer body, or casing, of the burner 1. Burner 1 comprises a coupling section 7 for joining, directly or indirectly, the burner 1 to an inner wall 101 of the oven, or grill, a longitudinally extended body that is laterally provided with a plurality of flame holes 4, and a closed ending section 8, opposite to the aforesaid coupling section 7. Coupling section 7 is provided with means for fixing, directly or indirectly, the casing to another inner wall of the oven, or grill.

The shells 5 and 6, reciprocally coupled with the interposition of an intermediate diaphragm 13 (see for example FIG. 4), at least partially define the inner geometry of the burner 1, that comprises, starting from its coupling section 7 to the closed section 8, a Venturi tube 2 of the type having an axial development, a main chamber 3, placed downstream to the Venturi tube 2 and longitudinally coaxially extended with it, as well as two side outer chambers 16, 17 (FIGS. 2 and 3), longitudinally extended along parallel axes that extend laterally to the main chamber 2 axis, and provided with the aforementioned flame holes 4.

Figure 2:
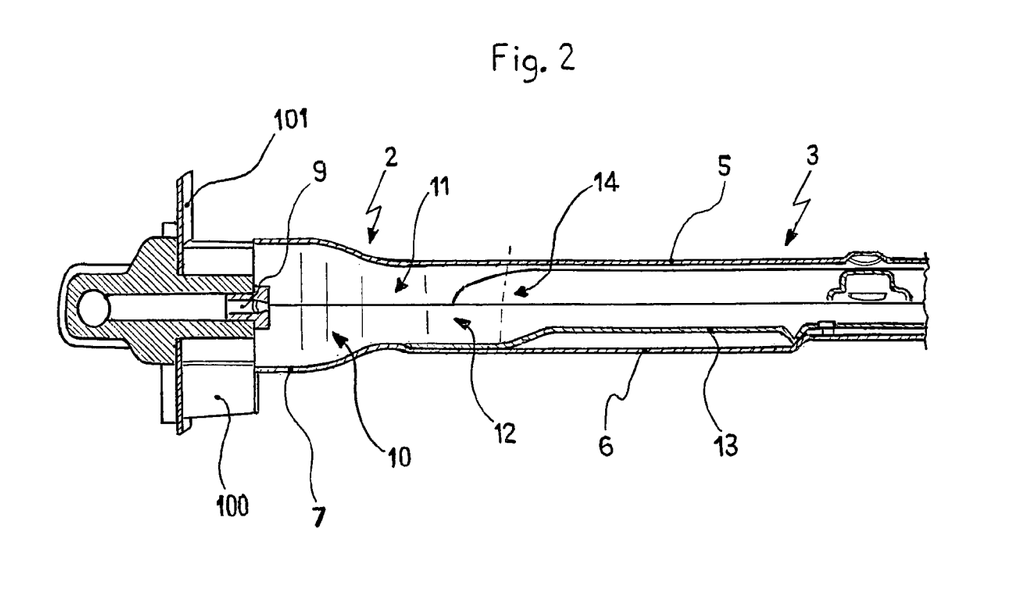
FIG. 2 is a partial side section view of the burner of FIG. 1.

Now referring also to FIG. 2, showing a side section of part of burner 1 in proximity of its coupling section 7, the connection between the burner 1 and an inner wall 101 of an oven, or grill, could be obtained by an opposite bracket 100, provided with means—known in the art—to constrain the burner 1 at its coupling section 7, and disposed as well to hold an injector 9 of the fuel gas in the burner itself 1, when the latter is just connected to such a bracket 100.

More in detail, as shown in FIG. 2, the inner geometry of the burner 1 provides a first tubular zone 10, immediately placed downstream the coupling section 7, presenting a truncated cone shape with a converging section, until it encounters a zone 11, having a cylindrical profile with a reduced section, that leads to a further zone 12, gradually widening relative to the zone 11, or presenting a diverging section, substantially in a plane orthogonal to the section of FIG. 2, as visible in FIG. 1. The zones 10, 11 and 12 extend along an unique axis and constitute the aforesaid Venturi tube 2 having an axial development, adapted to allow the mixing of the fuel gas, injected by the injector 9, with the (primary) air drawn in by the Venturi tube 2 itself from the environment outside the burner 1.

As can be seen in FIG. 2, Venturi tube 2 is partially defined by the lower shell 6 and the intermediate diaphragm 13, the latter being conveniently shaped to overlap the same lower shell 6 starting from a predefined position, and by the upper shell 5.

Considering the forward direction of the fuel gas, and then of the mixture, within the burner 1, immediately downstream to the outlet section 14 of the Venturi tube 2, a main chamber 3 supplies the mixture into the burner 1 itself. The main chamber 3 extends longitudinally and coaxially from the Venturi tube 2 and is defined by the intermediate diaphragm 13 and the upper shell 5.

Between the intermediate diaphragm 13 and the lower shell 6 is lower compensation chamber 15, fluidly connected with the main chamber 3 thanks to some holes 20 (FIG. 4), positioned along the lower wall of the intermediate diaphragm 13, intended not only for regulating the mixture outflow towards the outside, thanks to some passageways 23a, 23b opened outwardly, and positioned between diaphragm 13 and lower shell 6, but also to allow the optimal propagation of the flame to the several flame holes 4 during the ignition of the burner 1.

Figure 3:
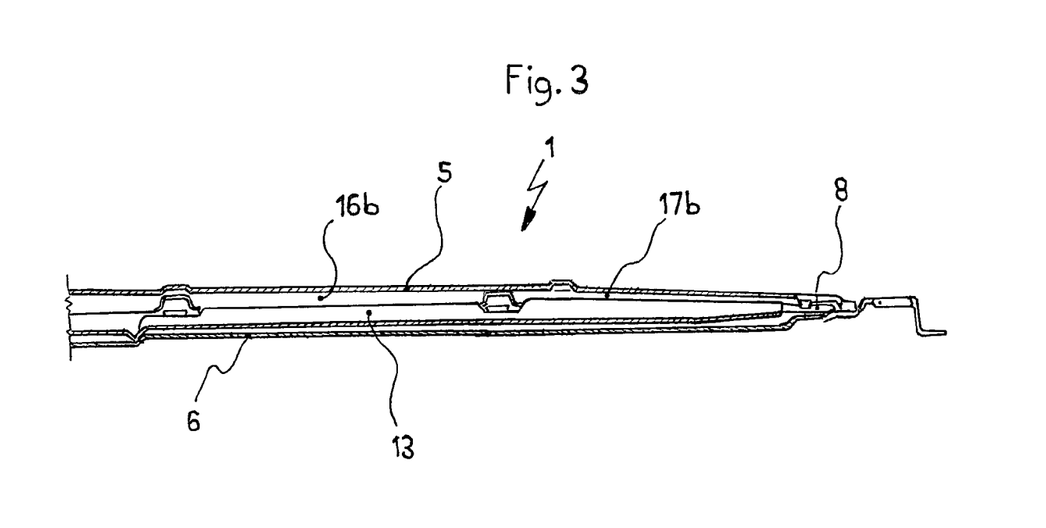
FIG. 3 is another partial side section view of the burner of the preceding figures.

Now referring to FIG. 3, showing a side section of a portion of the burner 1, herein described, at its closed ending section 8, it might be noted that the main chamber 3 is tapered in proximity of closed ending section 8.

In addition, FIG. 3 illustrates two openings 16b and 17b, located between the inner ribs of the intermediate diaphragm 13 and the upper shell 5 of the burner 1, defining a through section calibrated for the inflow of the fuel mixture towards one of the side delivery chambers 22b (see FIGS. 5 and 6) on which the aforesaid flame holes 4 are opened.

Figure 4:
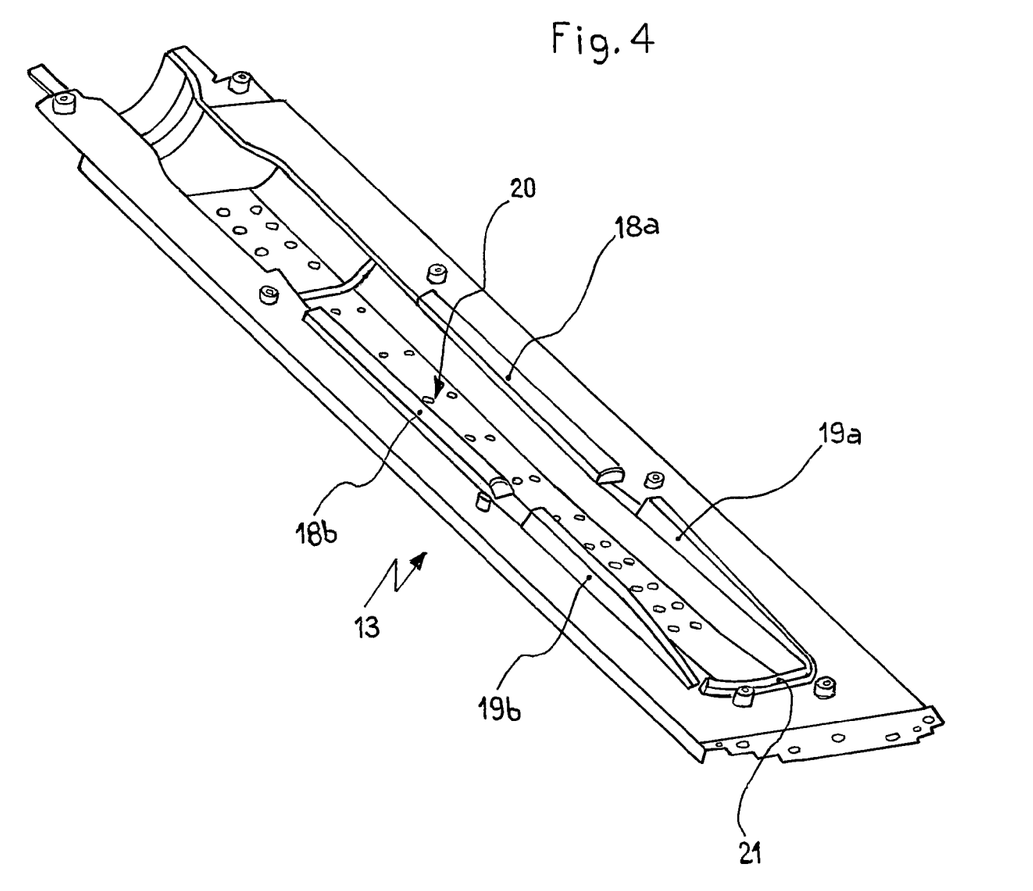
FIG. 4 is a top perspective view of an intermediate diaphragm within the two outer shells composing the burner body of FIG. 1.
Figure 5:
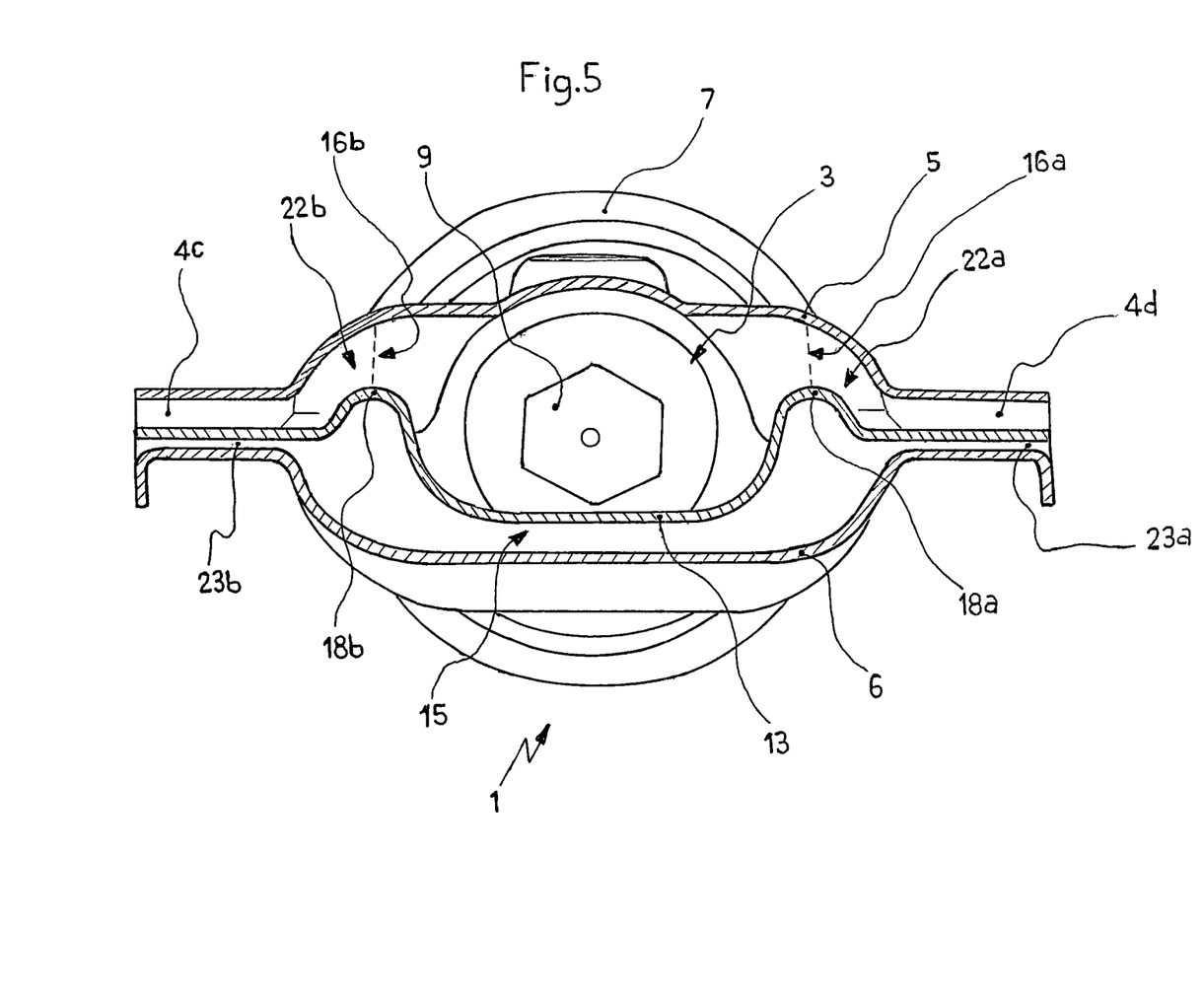
FIG. 5 is a frontal section view of the burner of FIG. 1, according to the cut line A-A represented in the same FIG. 1.
Figure 6:
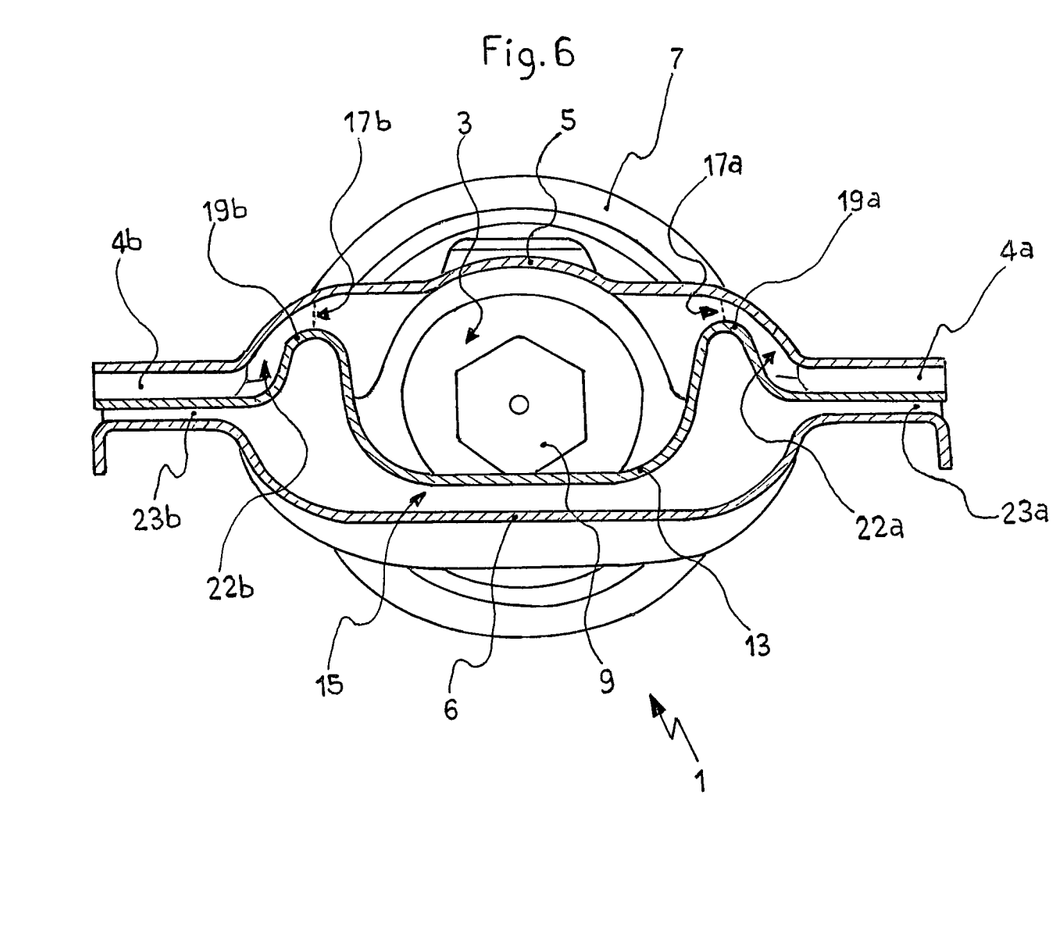
FIG. 6 is a front section view of the burner of FIG. 1, according to the cut line B-B.

In more detail, referring to FIGS. 4-6, the particular shape of the intermediate diaphragm 13 and of the upper shell 5 allows outer chambers 22a, 22b, which extend laterally from main distribution chamber 3, to extend along axes parallel to the axis of the latter; outer chambers 22a, 22b are in fluid communication with main chamber 3, thanks to the corresponding through openings 16a, 16b, 17a, 17b, having a cross section, relatively to the forward direction of the fuel mixture flow, with conveniently calibrated dimensions.

Advantageously, according to a preferred aspect of the present invention, the through openings 16a, 16b closest to the outlet section 14 of the Venturi tube 2, have a cross section greater than the cross section of the through openings 17a, 17b obtained at the closed ending section 8 of the burner 1.

Such a solution, as mentioned before, determines that the portion of the fluidic flow across the through openings 17a, 17b, which have a smaller cross section area, is subjected to greater load losses (that is, it will encounter greater difficulties in reaching the corresponding side delivery chambers 22a, 22b), relative to those load losses that the fluidic flow crossing the through openings 16a, 16b undergoes, which have a greater area.

The different cross sections of the through openings 16a, 16b and 17a, 17b, with mutually different load losses, substantially compensates the local pressure difference occurring in the inner zone of the burner 1 placed next to the closed ending section 8 relative to the inner zone placed immediately downstream to the Venturi tube 2. As a result, the fuel mixture concentration and pressure is substantially homogeneous within the side delivery chambers 22a, 22b, with the effect of obtaining regular and homogeneous flames along the whole burner 1.

FIGS. 4, 5, and 6 show in more detail the whole inner profile of the herein described burner, and particularly the distinctive shape of the intermediate diaphragm 13, placed between the two upper 5 and lower 6 shells of the burner 1.

Such an intermediate diaphragm 13, as shown in the figures, might be provided by forging of a metallic plate, to include a lower wall shaped to define the lower zone of the Venturi tube 2 and of the main chamber 3 for distributing the mixture, respectively, as well as the upper wall of the aforesaid lower compensation chamber 15. Such a lower wall, starting from a zone downstream to the Venturi tube 2, is substantially concave and conveniently provided with a plurality of holes 20, that allow the fluidic exchange between the main chamber 3, placed in the top, and the compensation chamber 15, placed in the bottom.

At the side ends of such a concave lower wall of the intermediate diaphragm 13, some lengths downstream from the Venturi tube 2 only, according to the forward direction of the fuel mixture flow, some upward extending longitudinal ribs 18a, 18b and 19a, 19b are present, which are provided by convex protruding portions of the plate comprising intermediate diaphragm 13, and which aid to define, respectively, the aforesaid calibrated through openings 16a, 16b and 17a, 17b for the mixture from the main chamber 2 to the outer chambers 22a, 22b.

Such ribs 18a, 18b and 19a, 19b project with different heights starting from the lower wall of the intermediate diaphragm 13, to thereby define some first through openings 16a, 16b for the mixture having a cross section greater than the cross section of some second through openings 17a, 17b placed upstream to the former.

It has to be mentioned that, in the particular embodiment herein illustrated, the through openings 16a, 16b, defined by the ribs 18a and 18b, as well as the through openings 17a, 17b defined by the ribs 19a, 19b, have a uniform cross section.

About that, since the burner 1 presents tapered closed section at the ending section 8 a tapering, the ribs 19a, 19b too, disposed to functionally couple with the upper shell 5 of the burner 1 in proximity of closed ending section 8, have a decreasing height relative to the lower wall of the intermediate diaphragm 15, such that the through openings 19a, 19b result in having a substantially uniform cross section.

Furthermore, at the outer sides of the ribs 18a, 18b, 19a, 19b, the intermediate diaphragm presents two substantially flat side walls defining, respectively, with the upper shell 5, the outer chambers 22a, 22b for delivering the fuel mixture, with the corresponding flame holes 4, 4a, 4b, 4c, 4d, and, with the lower shell 6, the lower compensation chamber 15, with the corresponding calibrated passageways 23a, 23b.

Finally, at the ending section 8 of the burner 1, the intermediate diaphragm further presents a final wall 21, protruding upstream as the ribs 18a, 18b and 19a, 19b, for fluidly closing the main distribution chamber 2 of the burner 1.

It has to be herein observed that, although it has been so far described an oven or grill burner, provided with a main distribution chamber, two delivery side outer chambers and a lower compensation chamber, provided by coupling an upper shell with a lower shell and interposing a shaped intermediate diaphragm, any different oven or grill burner structure, presenting at least one main chamber and at least one outer delivery chamber, connected to the main chamber by calibrated through openings for the fuel mixture having a greater section upstream and smaller section downstream, relative to the forward direction of the mixture flow, is part of the present invention.

Similarly, although it has been described above that an embodiment of the present invention proving substantially the presence of two longitudinal lengths in every side of the main distribution chamber along which the two calibrated through openings with different sections open, respectively, although being uniform in every length, every other configuration, by a continuous reduction of the cross through section too, allowing to obtain the afore-described effect, that is a smaller cross through section for the fluid from the main chamber to each delivery chamber at the closed ending section of the burner, is part of the group of possible embodiments of the present invention.

The oven or grill burner 1 operation, above described, is as follows.

Once the burner 1 is connected to the injector 9, and then to the burner 1 having been attached, at its coupling section 7, to the bracket 100 constrained to the oven or grill wall 101, the fuel gas outflow through the injector 9, driven by a user thanks to a tap known in the art, generates a gas flow passing through the Venturi tube 2, first in the zone having a converging section 10, then in the zone with a reduced section 11 and finally in the zone with a diverging section 12 of such a Venturi tube 2. As well known, the converging-diverging shape of the Venturi tube 2 causes in its turn, by the fuel gas flow passing, a depression in proximity of the zone with reduced section 11, such a depression drawing (primary) air from the surroundings and generating the mixing, that ends in the zone with a diverging section 12, of the fuel gas with such a primary air.

Then the fuel mixture thus formed passes into the main distribution chamber 3 and from here it reaches partially the lower delivery chamber 15, thanks to the holes 20 obtained on the concave lower wall of the intermediate diaphragm 13, and partially the side outer chambers 22a, 22b, passing through the calibrated openings 16a, 16b and 17a, 17b, respectively defined, as we could see, by the ribs, or convexities, 18a, 18b and 19a, 19b of the intermediate diaphragm 13 itself.

The different cross sections of calibrated openings 16a, 16b and 17a, 17b, greater in proximity of the Venturi tube 2 and smaller in proximity of the closed ending section 8 of the main chamber 3, determines a different "easiness" for the fuel mixture flow to reach side chambers 22a, 22b (i.e. the flow is subjected to different load losses), that causes a substantially homogeneous distribution of the fuel mixture, and of its local pressure, inside the outer chambers 22a, 22b, in spite of the tendency, due to the closure of the ending section 8 of the main chamber 3, in settling a greater pressure of the fuel mixture in proximity of such an ending section 8 of the burner 1.

From the inside of the outer delivery chambers 22a, 22b, as well as from the compensation chamber 15, the fuel mixture outflows through the flame holes 4a, 4b, 4c, 4d, respectively, and through the calibrated passageways 23a, 23b, providing flames, once the burner 1 has been ignited, appearing homogeneously and regularly distributed along the whole outside burner 1 itself.

The invention claimed is:

1. Gas burner for ovens, or grill, of the type comprising a Venturi tube for mixing fuel gas and primary air, a main distribution chamber, longitudinally extended along the flow forwarding direction of said mixture, and located downstream to said Venturi tube, as well as at least one delivery chamber placed outside said main chamber, and provided with flame holes for the outflow of the gas-primary air mixture, said main chamber and said at least one outer chamber being reciprocally fluidically connected, for at least a longitudinal length of said main chamber, by at least one through opening, wherein said at least one through opening has, relative to said longitudinal forwarding direction of the flow of said mixture, greater cross section in the upstream portion and smaller cross section in the downstream portion of said at least one longitudinal length of said main chamber, the cross section of the at least one through opening being continuously reduced along the longitudinal forwarding direction of the flow of said mixture.

2. Burner according to claim 1, wherein said at least one longitudinal length of said main chamber extends from a zone in proximity or at the outlet section of said Venturi tube to the opposite end of said main chamber.

3. Burner according to claim 1, characterized by comprising two chambers placed outside said main chamber, provided with flame holes, and fluidically connected to said main chamber via two corresponding through openings for said fuel mixture, said through openings being respectively obtained on at least one corresponding longitudinal length of said main chamber, and having, relatively to said longitudinal forwarding direction of the flow of said mixture, a greater cross section in the upstream portion and a smaller cross section in the downstream portion of said at least one corresponding length of said main chamber.

4. Burner according to claim 3, wherein said at least two outer chambers have longitudinal development, in the forwarding direction of the flow of said mixture, and they are disposed along axes parallel to said main chamber axis.

5. Burner according to claim 1, characterized by comprising an upper shell and an intermediate diaphragm that, once coupled, define at least partially said main chamber, said at least one outer chamber and said at least one through opening for the fuel mixture.

6. Burner according to claim 5, wherein said intermediate diaphragm presents at least one central concave portion and at least one side convex portion, said central concave portion defining with said upper shell said main chamber having longitudinal development and said at least one side convex portion defining said at least one through opening for the fuel mixture.

7. Burner according to claim 6, wherein said at least one side convex portion has a cross section decreasing for part or all its length.

8. Burner according to claim 5, characterized by comprising a lower shell coupled to said upper shell and to said intermediate diaphragm, said lower shell defining with said intermediate diaphragm a lower compensation chamber.

9. Burner according to claim 5, wherein said intermediate diaphragm is at least partially pierced.

10. Burner according to claim 5, wherein said intermediate diaphragm has a symmetrical cross section with respect to a plane perpendicular to a longitudinal axis of the burner.

11. Burner according to claim 1, wherein said Venturi tube is of the axial type.

* * * * *